(12) United States Patent
Lin et al.

(10) Patent No.: US 8,559,293 B2
(45) Date of Patent: Oct. 15, 2013

(54) WIRELESS COMMUNICATION APPARATUS, WIRELESS COMMUNICATION NETWORK AND METHOD OF CONTROLLING ROUTING SELECTION

(75) Inventors: Qiang Lin, Beijing (CN); Jun Tian, Beijing (CN)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 12/952,544

(22) Filed: Nov. 23, 2010

(65) Prior Publication Data

US 2011/0310788 A1 Dec. 22, 2011

(30) Foreign Application Priority Data

Jun. 21, 2010 (CN) .......................... 2010 1 0208046

(51) Int. Cl.
  *H04J 3/10* (2006.01)
  *H04B 1/00* (2006.01)
  *H04B 15/00* (2006.01)
  *H04B 7/00* (2006.01)
  *H04B 1/10* (2006.01)

(52) U.S. Cl.
  USPC ...... 370/201; 455/63.1; 455/63.2; 455/278.1; 455/296; 455/297

(58) Field of Classification Search
  None
  See application file for complete search history.

(56) References Cited

U.S. PATENT DOCUMENTS

| 2005/0270173 A1* | 12/2005 | Boaz ........................ 340/870.02 |
| 2007/0268880 A1* | 11/2007 | Bellur et al. .................. 370/338 |
| 2008/0069034 A1* | 3/2008 | Buddhikot et al. ........... 370/328 |

FOREIGN PATENT DOCUMENTS

| CN | 101400102 A | 4/2009 |
| CN | 101742529 A | 6/2010 |

OTHER PUBLICATIONS

Chinese First Office Action dated Jul. 3, 2013 from the corresponding Chinese Application No. 201010208046.4.

* cited by examiner

*Primary Examiner* — Ayaz Sheikh
*Assistant Examiner* — Sori Aga
(74) *Attorney, Agent, or Firm* — Katten Muchin Rosenman LLP

(57) ABSTRACT

A wireless communication apparatus, includes: a collision locating section for detecting a collision and determining a collision area in which the collision occurs, according to route requests received through an ad-hoc network based on an on-demand driving routing protocol, a relay node selecting section for selecting a relay node which is located outside the collision area and turn-off of which will not influence connectivity in the ad-hoc network, and a relay node controlling section for controlling the selected relay node to turn off in response to the selection of the relay node and keeping the selected node off if the collision in the collision area is alleviated or eliminated after the selected relay node is turned off.

19 Claims, 12 Drawing Sheets

WIRELESS COMMUNICATION APPARATUS, WIRELESS COMMUNICATION NETWORK AND METHOD OF CONTROLLING ROUTING SELECTION

FIELD OF INVENTION

The embodiments discussed herein are related to a wireless communication field, in particular to a wireless communication apparatus, wireless communication network and method of controlling routing selection in wireless communication network.

BACKGROUND OF THE INVENTION

In recent years, wireless communication technology develops rapidly, wherein ad-hoc network is applied to various fields for having advantages of dispensing with preset of network facilities, networking fast and automatically, and having strong invulnerability and robustness.

At present, the study of the ad-hoc network is mainly focused on MAC (Medium Access Layer) protocol and routing protocol. Selection of the two protocols influences not only transmission delay of data packet but also energy consumption of each node in network. It is of particular importance to consider the network energy consumption for applications of, for example, wireless sensor network in which it is not easy to change battery for the node.

In the ad-hoc network, several network nodes share the same wireless channel. Due to randomness of nodes transmission grouping, in order to reduce collision, an access mechanism of sharing channel is normally established by the MAC layer protocol. At present, the most common MAC layer protocol is Carrier Sense Multiple Access/Collision Avoidance (CSMA/CA) used in the IEEE802.15.4 and other mechanisms like protocols based on RTS (RequesttoSend), CTS (CleartoSend), ACK(AC-Knowledgement) used in the IEEE802.11.

At present, routing protocols for the ad-hoc network are generally classified into routing table protocol and source-initiated on-demand routing protocol, wherein the source-initiated on-demand routing protocol is, but not limited to, protocols like DSR, AODV, AOMDV, LMR, TORA, ABR, SSR and so on.

Conventionally, during studying of improving network real-time performance and energy using rate, OSI layering protocol module of IP network is generally used to optimize a specific network layer (medium access layer or network layer) or to optimize by combining layers of network, such that nodes of the ad-hoc network optimize its parameters according to performance requirements.

SUMMARY OF THE INVENTION

One aspect of the embodiment is a wireless communication apparatus, comprising a collision locating section for detecting a collision and determining a collision area in which the collision occurs, according to route requests received through an ad-hoc network based on an on-demand driving routing protocol; a relay node selecting section for selecting a relay node which is located outside the collision area and turn-off of which will not influence connectivity in the ad-hoc network; and a relay node controlling section for controlling the selected relay node to turn off in response to the selection of the relay node and keeping the selected node off if the collision in the collision area is alleviated or eliminated after the selected relay node is turned off.

The object and advantages of the embodiment will be realized and attained by at least the elements, features, and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

Referring to the explanations of the present invention in conjunction with the drawings, the above and other objects, features and advantages of the present invention will be understood more easily. In the drawings, the same or corresponding technical features or components are represented by the same or corresponding reference signs. Sizes and related positions of the units are not necessarily drawn in ratio in the drawings.

DESCRIPTION OF THE PREFERRED EMBODIMENTS

Figure 1:
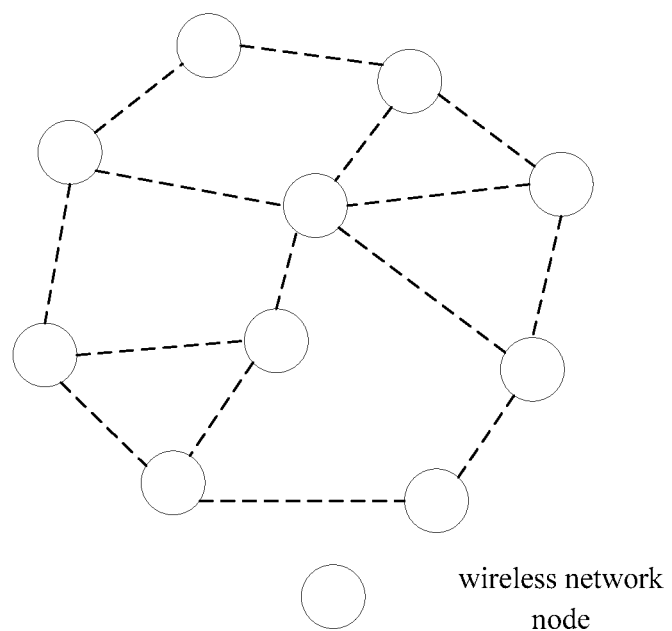
FIG. 1 is a schematic view illustrating plane network structure of the ad-hoc network.

The embodiments are discussed hereinafter in conjunction with the drawings. It should be noted that representation and description of components and processes unrelated to the present invention and well known to one of ordinary skill in the art are omitted in the drawings and the description for the purpose of being clear.

Figure 2:
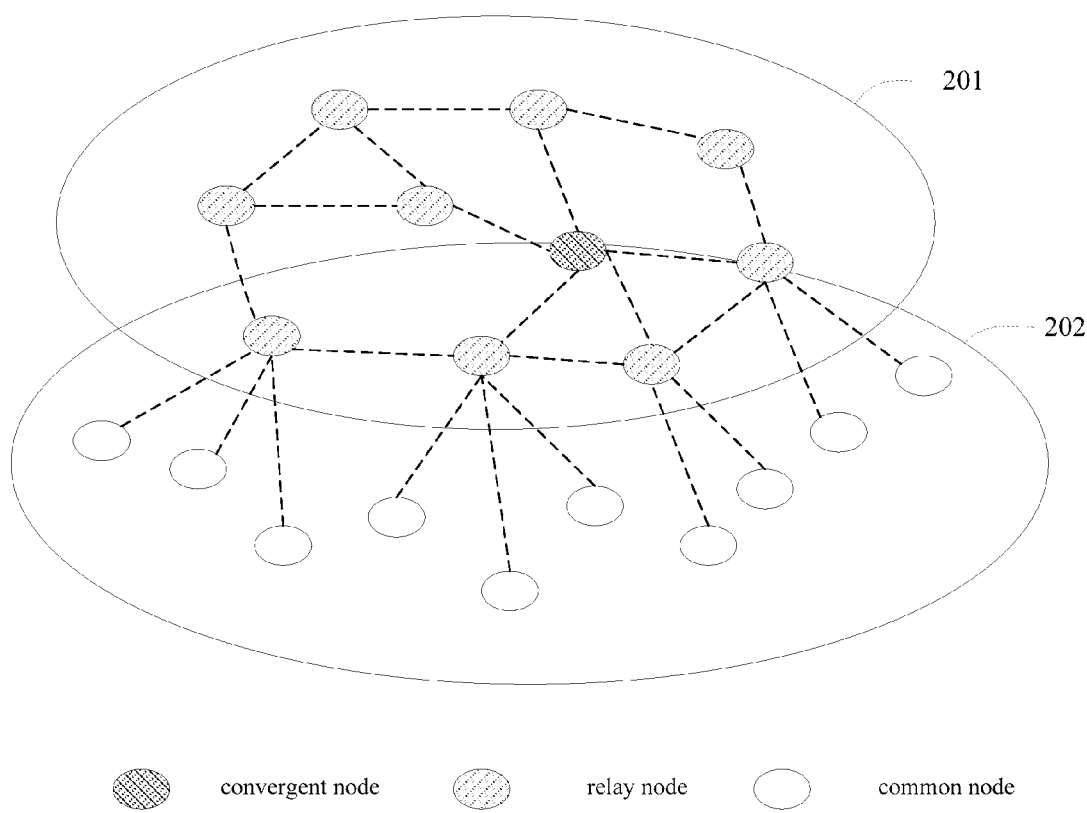
FIG. 2 is a schematic view illustrating hierarchical network structure of the ad-hoc network.
Figure 3:
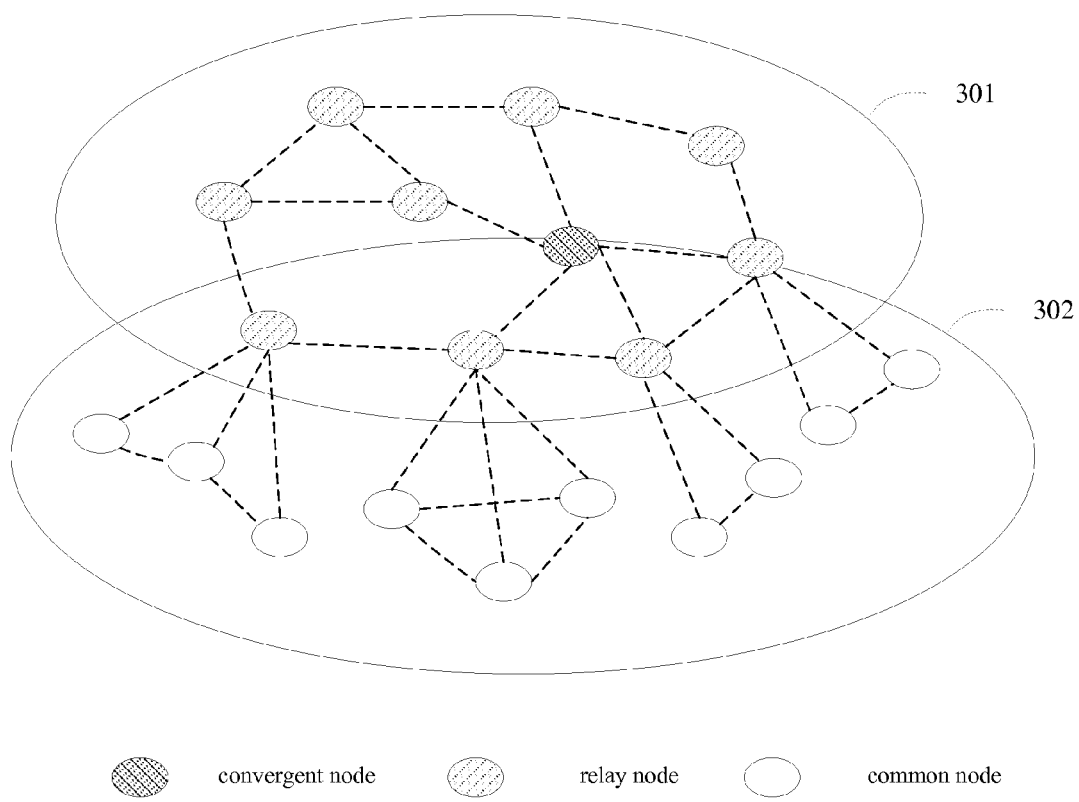
FIG. 3 is a schematic view illustrating hybrid network structure of the ad-hoc network.

Now, referring FIGS. 1 to 3, network structures applicable for the present application are described. The ad-hoc network is normally constructed as plane network structure, hierarchical network structure and hybrid network structure based on network scales and using requirements.

FIG. 1 is a schematic view illustrating plane network structure of the ad-hoc network. As shown in FIG. 1, each node in network structure has peer to peer structure and completely consistent function features, and the nodes do not have a center management node, and is applicable for small scale network. In such a small scale network, the probability of occurrence of communication collision is relatively low, and it is easier to maintain node apparatus.

FIG. 2 is a schematic view illustrating hierarchical network structure of the ad-hoc network. In hierarchical network, the network is divided into an upper layer 201 and a lower layer 202. The upper layer 201 is backbone node, that is, convergent node and relay node; and the lower layer 202 is common node. The backbone node and the common node have different functional features, that is, each backbone node includes functional protocols, such as, MAC, routing, management and security, while the common node may not have functions like routing, management and convergent processing.

FIG. 3 is a schematic view illustrating hybrid network structure of the ad-hoc network. Similar to the hierarchical network structure, the hybrid network structure is also divided into an upper layer and a lower layer. The upper layer 301 is backbone node including convergent node and relay node, and the lower layer 302 is common node. The hybrid network structure is distinguished from the hierarchical network structure in that common nodes may communicate with each other directly.

Middle and large scale wireless ad-hoc networks usually use hierarchical network structure and hybrid network structure. The present invention is applicable for ad-hoc network having convergent node, relay node and common node, for example, ad-hoc network using hierarchical network structure or hybrid network structure.

Working manner of source-initiated on-demand routing protocol is explained by taking the AODV (Ad-hoc On-demand Vector Routing) protocol as an example.

In the AODV, the whole network is static unless there is a request for establishing connection. That is, one network node broadcasts one route request (RREQ) only when a connection is to be established. Other AODV nodes forward the request, and record the source node and a temporal routing for returning to the source node. The destination node selects a path with minimum routing cost to reply route reply (RREP) after receiving the RREQ, thereby establishing route transmitting the source node data. The route with minimum cost may be the route with minimum hop. When the link is down, routing error is sent back to the source node. Therefore, the source node reinitiates route search, that is, rebroadcasts route request RREQ.

Figure 4:
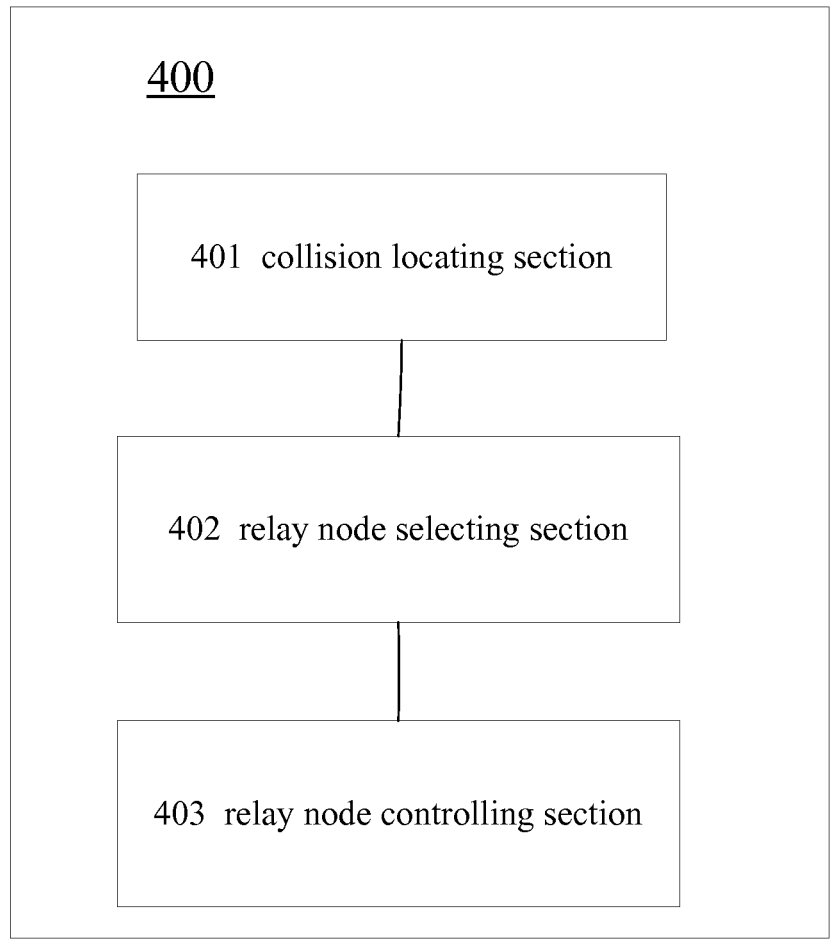
FIG. 4 is a structural diagram illustrating wireless communication apparatus according to an embodiment of the present invention.

FIG. 4 is a structure diagram showing a wireless communication apparatus 400 according to an embodiment of the present invention.

As shown in FIG. 4, the wireless communication apparatus 400 includes collision locating section 401, relay node selecting section 402 and relay node controlling section 403.

The collision locating section 401 detects a collision and determines a collision area in which the collision occurs, according to route requests RREQ received through an ad-hoc network based on an on-demand driving routing protocol.

The collision caused by the collision source node may influence other nodes in using communication resources. The area formed by various nodes involved with such an influence is called a collision area. For example, the collision area may be formed by taking involved nodes as a boundary. For another example, the sum of the respective influence range of the involved nodes may be regarded as a collision area. The influence range may also be selected based on requirements, for example, select different hops to determine an influence range.

The relay node selecting section 402 selects a relay node which is located outside the collision area and turn-off of which will not influence connectivity in the ad-hoc network after an area where a collision occurs is determined by the collision locating section 401. For example, for node B connected between nodes A and C, if there is a direct connection between nodes A and C, the turn-off of the node B will not influence connectivity of the ad-hoc network.

The relay node controlling section 403 controls the selected relay node to turn off in response to the selection of the relay node and keeps the selected node off if the collision in the collision area is alleviated or eliminated after the selected relay node is turned off.

Figure 5:
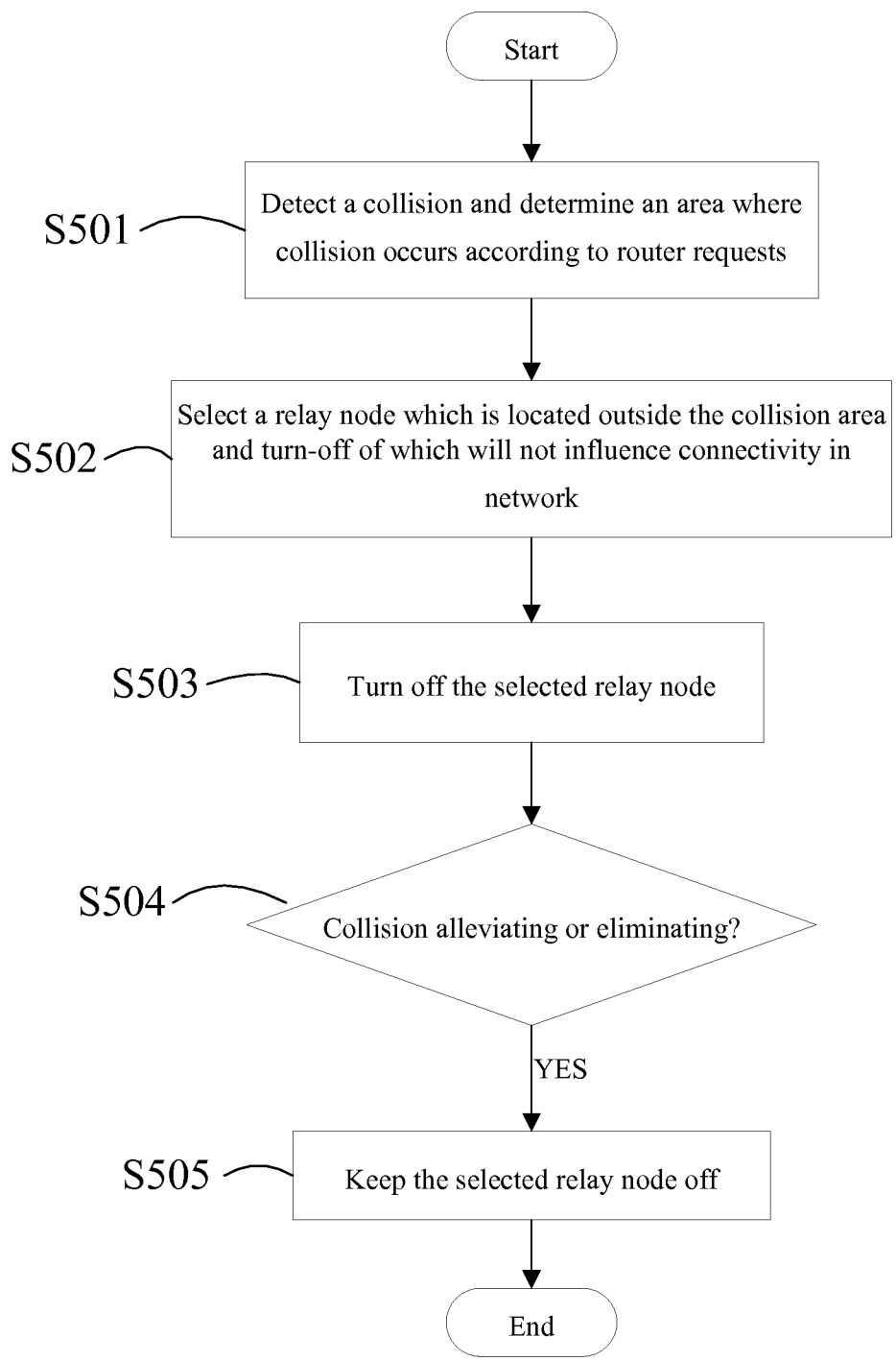
FIG. 5 is a flow chart illustrating the method of controlling routing selection in the wireless communication network according to an embodiment of the present application.

Working process of the wireless communication apparatus 400 will be described in more detail in conjunction with the flow chart in FIG. 5. FIG. 5 is a flow chart illustrating the method of controlling routing selection in wireless communication network according to an embodiment of the present invention.

In step S501, detect a collision and determine a collision area in which the collision occurs, according to route requests RREQ received through an ad-hoc network based on an on-demand driving routing protocol.

When referring to the on-demand driving routing protocol hereinafter, the AODV will be taken as an example for explanation. However, those skilled in the art should appreciate that on-demand driving routing protocols such as DSR, LMR, TORA, ABR and SSR may be used, but it is not limited thereto.

As introduced above, in the wireless network using AODV protocol, the source node may reinitiate route search to rebroadcast RREQ signal in case of a failure communication and a routing error. When the wireless communication apparatus according to the present invention used as convergent node receives the signal, the collision locating section 401 analyzes information included in the RREQ signal.

The RREQ message may include, for example, source_addr, source_sequence and broadcast_id, that is, source node address, sequence number of the source port and broadcast ID. In one embodiment, the collision locating section 401 may count RREQ transmitted from each node based on the above information. It is determined that the collision is detected if some node or nodes transmit RREQ for a number of times larger than a threshold value within a specific time period.

According to the location or the area where the collision source node transmitting the RREQ locates, the collision locating section 401 determines the collision area. As stated above, the collision area may be formed by taking nodes involved with the collision caused by the source node as a boundary, or, the sum of the respective influence range of the involved nodes may be regarded as collision area. The influence range may also be selected based on requirements, for example, select different hops to determine the influence range.

In step S502, select a relay node which is located outside the collision area and turn-off of which will not influence connectivity in the ad-hoc network. In some embodiments, the influence due to turn-on and turn-off of the relay node on the network topology is predetermined In one embodiment, the relay node selecting section 402 may be configured to select in preference the relay node having a smaller distance from a boundary of the collision area. That is, in the step S502, the relay node having a smaller distance from a boundary of the collision area may be selected in preference, because the smaller the distance of the relay node from the boundary of the collision area is, the bigger the influence due to turn-on and turn-off of the relay node on the communication in the collision area will be.

In another embodiment, the relay node selecting section 402 may be further configured to select the relay node whose turn-on and turn-off have an influence on the network topology satisfying a predetermined requirement, that is, in the step S502, the relay node whose turn-on and turn-off have an influence on the network topology satisfying a predetermined requirement may be selected. The predetermined requirement may comprise the turn-on and turn-off of the relay node may only influence communication with its adjacent nodes, or the turn-on and turn-off of the relay node influence communication with its abutting areas.

According to distance of the relay node from a boundary of the collision area, or the magnitude of the influence due to turn-on and turn-off of the relay node on the network topology (for example, only influence communication of its adjacent nodes or influence communication of its abutting areas), the priority is divided for the relay nodes. In one example, the relay node whose turn-on and turn-off influence only communication with its adjacent nodes is called as single-level node, and the relay node whose turn-on and turn-off influence communications with its abutting areas is called as multi-level node.

In some embodiments, the influence due to turn-on and turn-off of the relay node on the network topology is predetermined The coordinating node of the network may pre-store the topology influence information during initiation of the network.

In step S503, turn off the relay node selected in the step S502.

In step S504, determine whether the collision in the collision area is alleviated or eliminated after the relay node is turned off.

The determining may be performed through several manners, one example is that the relay node controlling section 403 determines the collision in the collision area is alleviated or eliminated, if the number of the nodes in the collision area, each of which repeatedly transmits a route request for a number of times larger than a threshold value within a specific time period after the selected relay node is turned off, decreases.

If the result is determined as "Yes" in the step S504, control the relay node in the step S505 to keep it off.

Turning off selectively the relay node which is located outside the collision area and will not influence the connectivity of the ad-hoc network can prevent the source node outside of the collision area selecting a node inside the collision area as the relay node in its communication route, thereby alleviating jam and impact inside the collision area. After the selected relay node is turned off, if the collision in the collision area is alleviated or eliminated, the turn-off of the selected relay node may perform a function of alleviating collision, so keep the relay node off.

In one embodiment, the relay node controlling section 403 may be configured to control the selected relay node to turn on in the event that the collision in the collision area is not alleviated nor eliminated after the selected relay node is turned off, and, the relay node selecting section 402 is configured to select another relay node which is located outside the collision area and turn-off of which will not influence the connectivity in the ad-hoc network in response to controlling the selected relay node to turn on.

Figure 7:
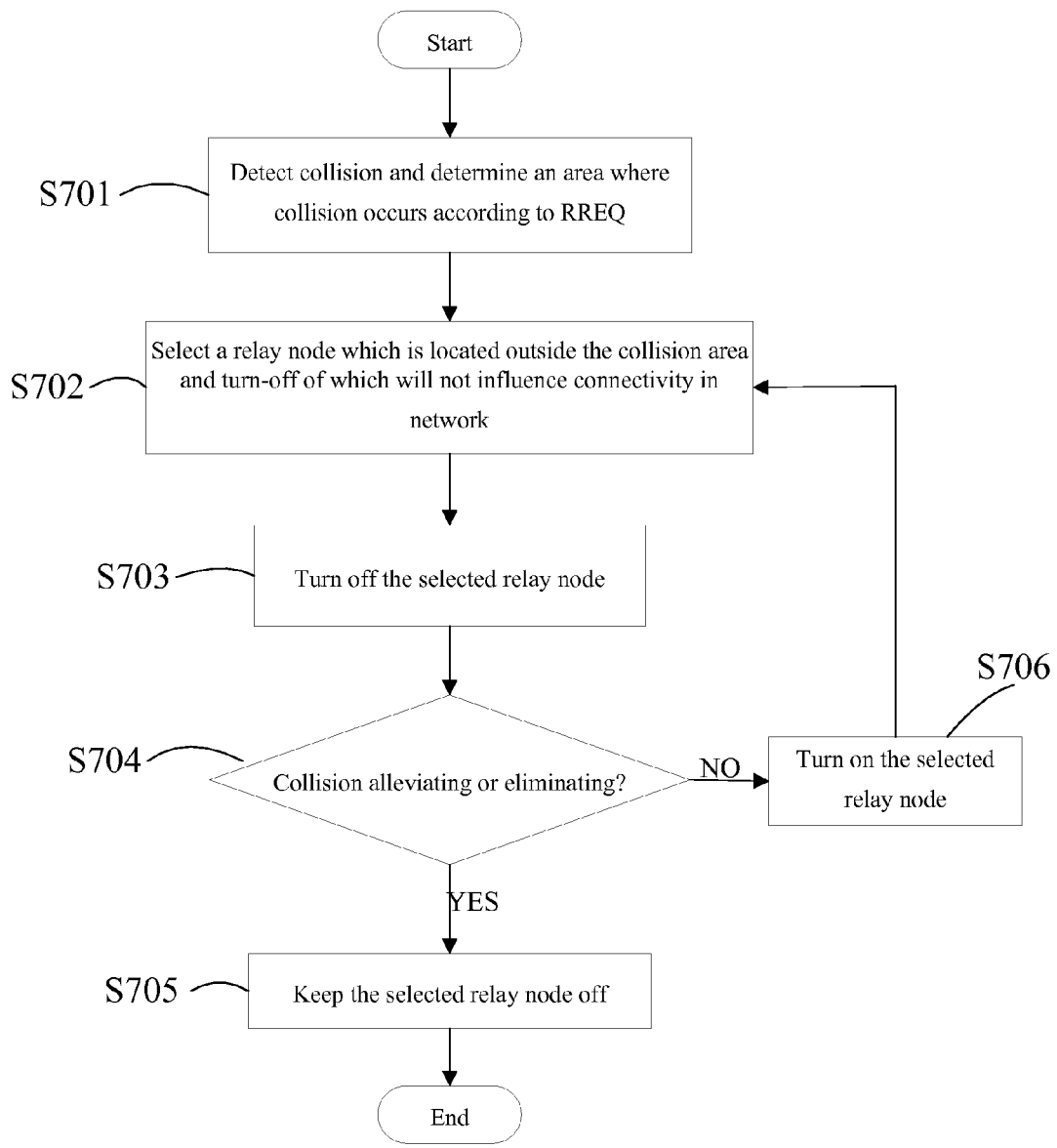
FIG. 7 is a flow chart illustrating the method of controlling routing selection according to another embodiment of the present invention.

FIG. 7 is a flow chart illustrating the method of controlling routing selection according to another example of the present invention. The steps S701 and S705 in FIG. 7 are similar to the steps S501 and S505 in FIG. 5, so detail descriptions thereof are omitted here.

As shown in FIG. 7, if it is determined in the step S704 that the collision in the collision area is not alleviated nor eliminated after the selected relay node is turned off, that is, the result is determined as "No", control the selected relay node to turn on; and the process returns to step S702. In the step S702, select another relay node which is located outside the collision area and turn-off of which will not influence the connectivity in the ad-hoc network in response to controlling the selected relay node to turn on.

In the embodiment, in the event that the turn-off of the selected relay node cannot alleviate jam, turn on the selected relay node and select another relay node to turn off until the relay node whose turn-off can alleviate or eliminate the collision in the collision area is found.

The relay nodes which are selected in succession to control their turn-off may be adjacent, that is, spacing with a hop of 1; or not adjacent, that is, spacing with a specific number of hops greater than 1.

It can be seen from the above descriptions that in the wireless communication network using the wireless communication apparatus of the present invention, the convergent node does not reply directly route reply RREP after receiving the RREQ signal; but determines whether a collision of the communication of the source node occurs based on the RREQ signal, thereby dynamically adjusting network topology, alleviating or eliminating communication jam in the collision area by selecting to turn off appropriate relay nodes to control routing selections of the source nodes outside the collision area. Therefore, the present invention improves routing selection efficiency of the wireless communication network, thereby shortening data transmission delay of the ad-hoc network, improving network real-time performance and network energy using rate, and reducing network total energy consumption.

Figure 6A:
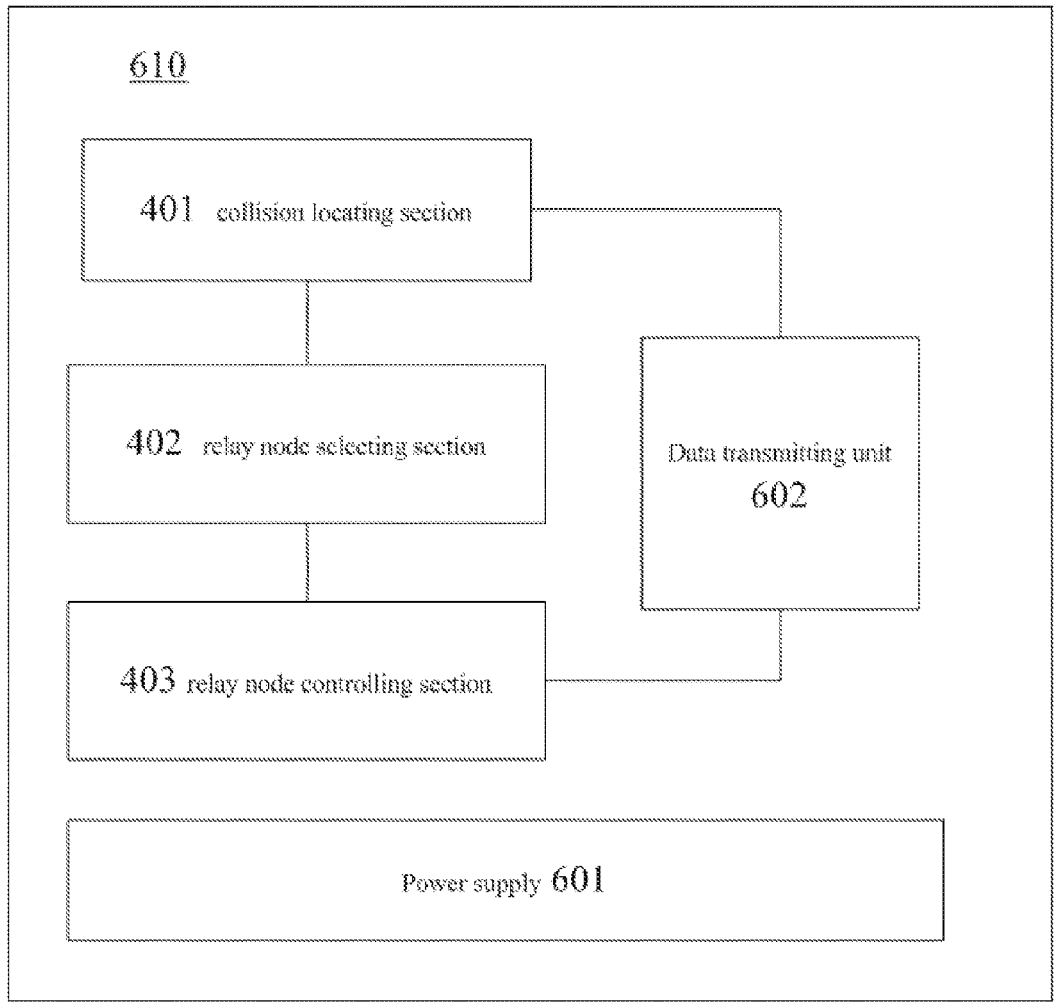
FIGS. 6A, 6B and 6C are structural diagrams illustrating examples implementing the wireless communication apparatus according to the present invention.
Figure 6B:
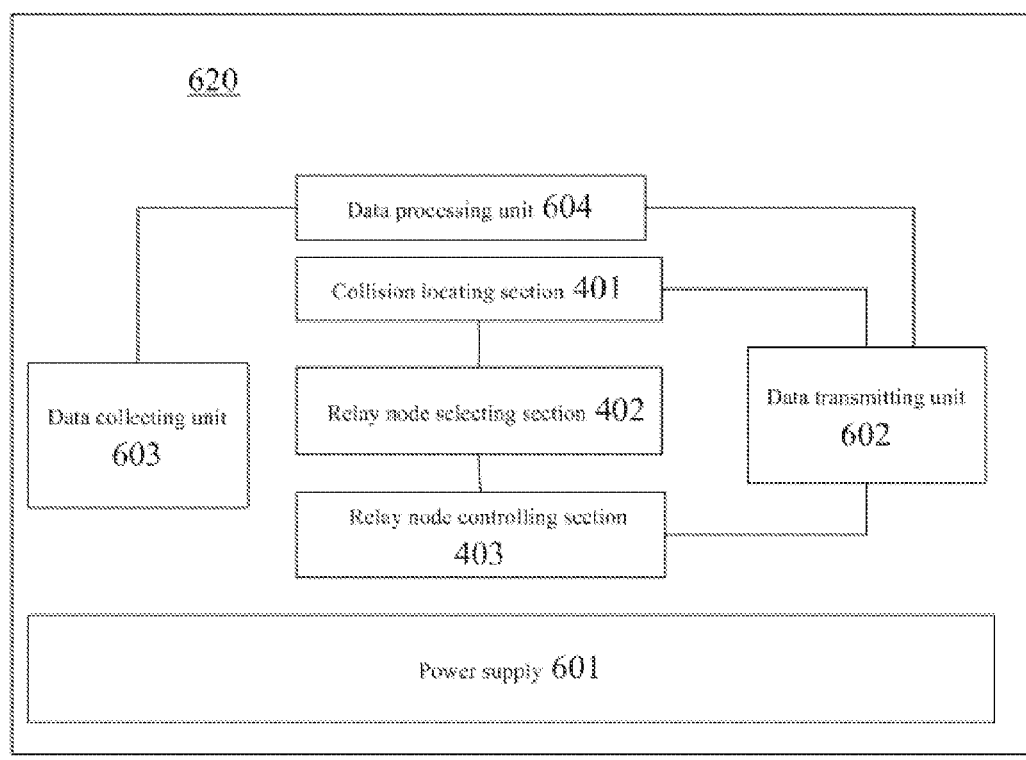
Figure 6C:
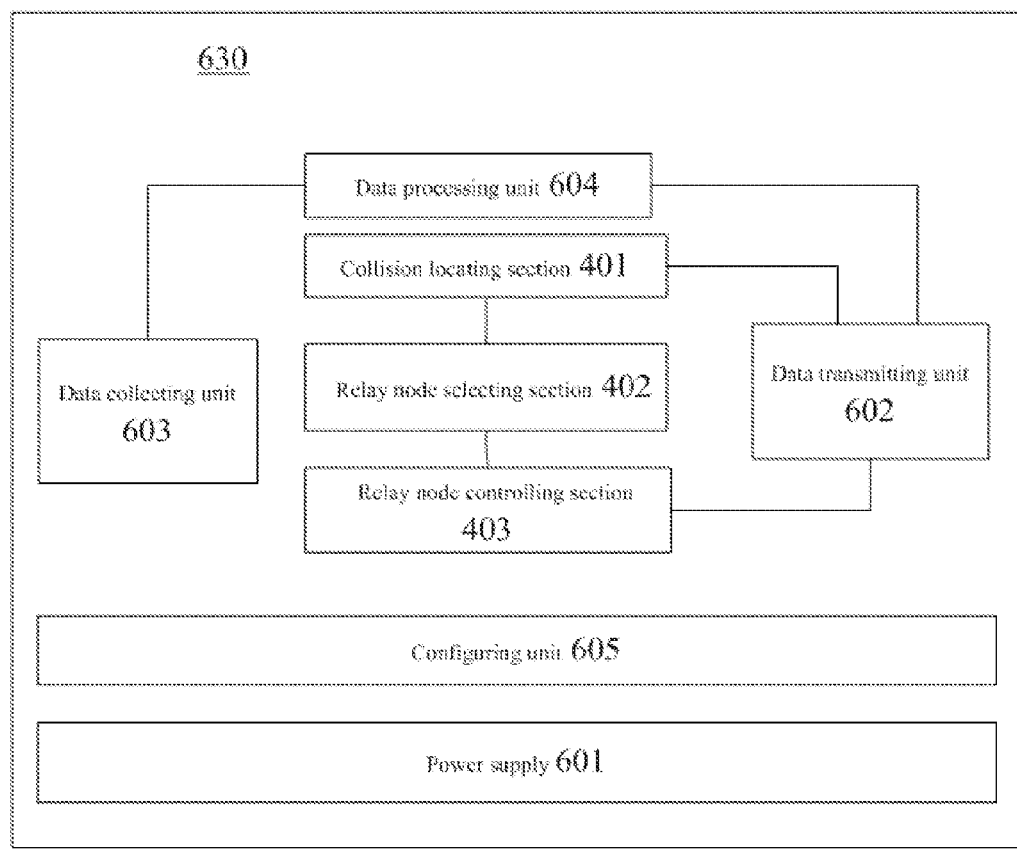

The implementing examples of the wireless communication apparatus according to the present invention are described in detail by referring to FIGS. 6A to 6C hereinafter. FIGS. 6A, 6B and 6C are structural diagrams illustrating examples implementing the wireless communication apparatus according to the present application.

In FIG. 6A, the wireless communication apparatus 610 comprises: the collision locating section 401, relay node selecting section 402 and relay node controlling section 403 as shown in FIG. 4, and power supply 601 supplying power to each module and data transmitting unit 602 performing data transmission.

In the wireless communication apparatus 610, the data transmitting unit 602 receives RREQ message and communication data from the network, provides the received RREQ message to the collision locating section 401 for collision detecting and locating, and transmits communication data and control instruction of the relay node controlling section 401 on the selected relay node.

FIGS. 6B and 6C show implementing examples of applying the wireless communication apparatus of the present invention to wireless sensor network. The wireless sensor network is a typical application of the ad-hoc network, and is a wireless network formed by a great number of sensor nodes with low complexity through an ad-hoc manner. Each network node is comprised of sensor module, processing module, communication module and power supply module, and completes three basic functions of data collecting, data receiving and transmitting and data forwarding.

As shown in FIG. 6B, the wireless communication apparatus 620 comprises collision locating section 401, relay node selecting section 402 and relay node controlling section 403 as shown in FIG. 4, and power supply 601, data transmitting unit 602, data collecting unit 603 and data processing unit 604.

As described in FIG. 6A, the power supply 601 is used to supply power to each module. The data transmitting unit 602 receives RREQ message and communication data from network, provides the received RREQ message to the collision locating section 401, and transmits communication data and the control instruction on the selected relay node from the relay node controlling section 401.

The data collecting unit 603 collects physical signals like temperature, light, and vibration in the environment where it locates, and converts the physical signals into digital signals that the data processing unit 604 can process. The data processing unit 604 provides the processed data to the data transmitting unit 602 for transmitting.

FIG. 6C shows another embodiment of the wireless communication apparatus according to the present invention. As shown in FIG. 6C, as compared with the wireless communication apparatus 620 in FIG. 6B, the wireless communication apparatus 630 further comprises configuring unit 605 which is used to configure whether to start functions of such modules as data collecting unit 603, data processing unit 604, collision locating section 401, relay node selecting section 402, and relay node controlling section 403 based on requirements in actual application.

The implementing manners of the configuring unit 605 may include switching, programming, FPGA, fusing, and so on, but are not limited thereto.

Hereinafter, the embodiments will be described in detail in conjunction with specific examples of the wireless communication sensor network to help further understanding the technical solution of the present invention.

On the basis of the IEEE802.15.4 protocol, IEEE802.11 protocol and AODV protocol, which are typically used in the wireless sensor network, the embodiment applies wireless communication apparatus and the method of controlling routing selection of the present invention for the wireless sensor network with the hybrid topology structure, so as to improve routing selecting efficiency of wireless sensor network, thereby improving real-time performance and energy efficiency.

Figure 10:
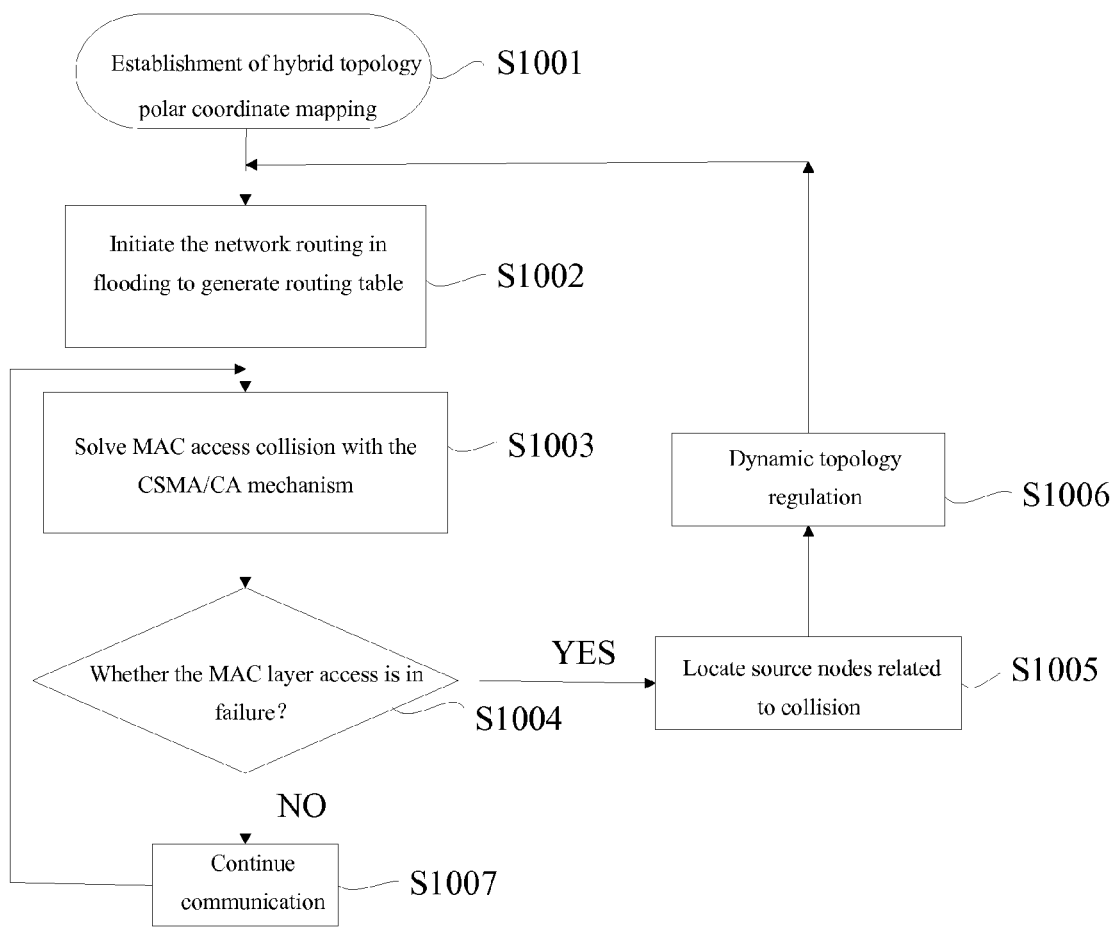
FIG. 10 is a flow chart of controlling routing selection in wireless sensor network according to a specific embodiment of the present application.

FIG. 10 is a flow chart illustrating the method of controlling network routing selection in the wireless sensor network according to a specific embodiment of the present invention. The flow chart combines MAC layer control, network layer control and dynamical topology control in the wireless sensor network, achieving the goal of improving wireless sensor network performance by optimization.

As shown in FIG. 10, in step S1001, establish wireless sensor network based on IEEE802.15.4 protocol and AODV protocol, wherein the topology is hybrid topology. Establish a polar coordinate system or spherical coordinate system by taking the convergent node transmitting initiated network maintenance signal as a center of the circle, map position information of each relay node as polar coordinate or spherical coordinate, and describe the node position in 4 dimensional (polar coordinate) or 5 dimensional (polar coordinate) mathematical manner, that is:

$$n_i \in M, n_i = (\rho_i, \theta_i, P_i, s), s \in \{0,1\}$$

or $$n_i \in M, n_i = (\rho_i, \alpha_i, \beta_i, P_i, s), s \in \{0,1\}$$

Wherein, M is the relay node set, $n_i$ is the relay node, $\rho_i, \theta_i$ or $\rho_i, \alpha_i, \beta_i$ are indicative of respectively two dimensional or three dimensional geography position information of the middle node, s is representative of switching state of the relay node, and the value range of s is 0 and 1, wherein 1 is representative of turn-on of the node, and 0 is representative of turn-off of the node. The value in an initiation state is 1, that is, the rely nodes are all turned on. $P_i$ is the priority that is divided according to distance of the relay node from a boundary of the collision area, or the magnitude of the influence due to turn-on and turn-off of the relay node on the network topology (for example, only influence communication of its adjacent nodes or influence communication of its abutting areas). The spherical coordinate system can be inferred from the polar coordinate system in the present invention, so the following is described by taking the polar coordinate system as an example.

Based on the magnitude of the influence due to the turn-on and turn-off of the relay node per se on the network topology, the relay nodes in the polar coordinate system may be divided into single-level control node and multi-level control node. The turn-on and turn-off of the single-level control node may influence only communication with its adjacent nodes, and the turn-on and turn-off of the multi-level node may influence communication of its abutting areas.

In step S1002, according to the AODV protocol, the network is initiated in flooding, that is, the node received the message forwards RREQ signal in broadcasting, transmitting RREQ to other nodes except the node from which the data is transmitted, until the RREQ is transmitted to the destination node. After receiving the RREQ signal, the destination node replies RREP signal to the source node, and the source node determines the network layer routing based on the replied RREP. During initiating the network, all relay nodes are on.

In step S1003, according to the routing table determined by the network layer, the source node and the destination node communicate. During communication, in case of an occurrence of MAC layer access collision, the collision is solved through CSMA/CA.

In step S1004, when the data packet is transmitted according to the CSMA/CA mechanism repeatedly in failure for many times, it is assured that the communication is failed, and the source node retransmits RREQ signal to determine again a new routing in the network layer. If the retransmission is successful, enter step S1007 in FIG. 3.

In step S1005, since RREQ signal is spread in broadcasting, when receiving the signal, the convergent node analyzes information included in the RREQ signal to determine position information of the source node generating the collision (the position or area where the node locates), information included in the RREQ message comprises source_addr, source_sequence, broadcast_id, that is, source node address, sequence number of source port, and broadcasting ID. In the embodiment, the convergent node counts the RREQ transmitted repeatedly from the source node within a certain period using the information, to determine an occurrence of the collision.

In step S1006, the convergent node determines the collision area. In the embodiment, the collision area is formed by taking nodes involved with influence of the collision caused from the collision source node as a boundary.

Furthermore, in step S1006, a single-level control node which is located adjacent to the collision area and turn-off of which will not influence connectivity is selected as an initiation selection node, and the relay node is selected by taking the direction which is away from the collision area as an available direction to control to turn off; and keep the selected node off, or turn on over again the node and select another relay node to control to turn off, according to the influence due to the turn-off of the relay node on communication in the collision area, that is, whether the collision can be alleviated or eliminated. Relay nodes selected in succession space with a specific number of hops. Furthermore, according to requirements, the node selected in initiating may be a multi-level control node, and may be selected integrally among single-level control nodes, and then selected integrally among multi-level control nodes, or vice verse. The number of receiving repeatedly transmitted RREQ signal in a unit of time is compared with a predetermined threshold value as a basis for judging whether the collision is alleviated or eliminated.

The convergent node transmits turn-on or turn-off instruction to control turn-on and turn-off, implementing dynamic regulation of the topology structure. Return back to the step S1002.

In step S1007, continue the communication process to transmit or receive data packet.

Figure 8:
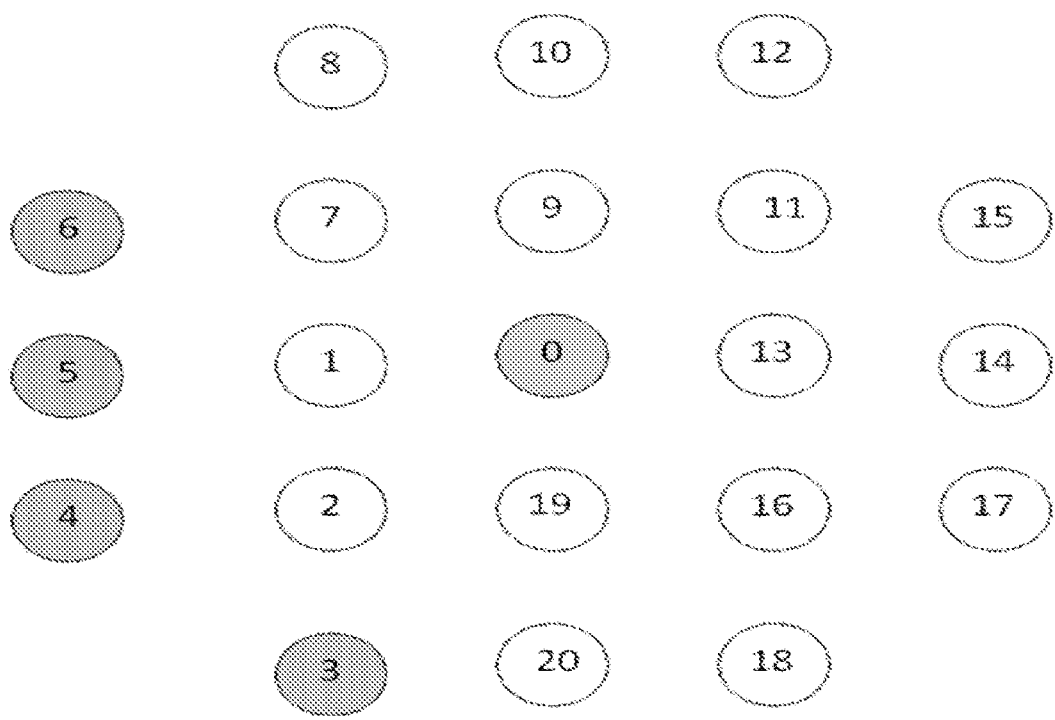
FIG. 8 is a schematic view illustrating transmitting scenes in parallel according to an embodiment of the present invention.

Hereinafter, referring to FIGS. 8 and 9, the flow in FIG. 10 is described in more detail. FIG. 8 is a schematic view of transmitting scenes in parallel according to an embodiment of the present invention, and describes a basic scene which influences the network energy consumption and communication real-time performance caused from the CSMA/CA mechanism.

In FIG. 8, 21 wireless nodes are set in total, wherein, there is one convergent node (0), 8 relay nodes (1, 2, 19, 16, 13, 11, 9, 7), and 10 common nodes (3, 4, 5, 6, 8, 10, 12, 14, 15, 17, 18, 20), forming a hybrid topology structure. In the scene, the relations among the 8 relay nodes and the convergent node are mapped into the polar coordinate structure as shown in FIG. 9. The mapped relations are shown in Table 1:

TABLE 1

| ID | $n_i$ | $P_i$ |
|---|---|---|
| 1 | (10, 0, 1) | 1 |
| 19 | $(10, \frac{\pi}{2}, 1)$ | 1 |
| 13 | (10, π, 1) | 1 |
| 9 | $(10, \frac{3\pi}{2}, 1)$ | 1 |
| 2 | $(14, \frac{\pi}{4}, 1)$ | 2 |
| 16 | $(14, \frac{3\pi}{4}, 1)$ | 2 |
| 11 | $(14, \frac{5\pi}{4}, 1)$ | 2 |
| 7 | $(14, \frac{7\pi}{4}, 1)$ | 2 |

An initiation mathematical description to the relay node in the coordinate structure is:

$$n_1 = (10, 0, 1, 1); n_{19} = (10, \frac{\pi}{2}, 1, 1); n_{13} = (10, \pi, 1, 1);$$

$$n_9 = (10, \frac{3\pi}{2}, 1, 1); n_2 = (14, \frac{\pi}{4}, 2, 1); n_{16} = (14, \frac{3\pi}{4}, 2, 1);$$

$$n_{11} = (14, \frac{5\pi}{4}, 2, 1); n_7 = (14, \frac{7\pi}{4}, 2, 1).$$

In a simulation shown in FIG. 8, an extreme condition in network communication is simulated, that is, nodes whose ID numbers are 3, 4, 5 and 6 transmit at the same time data packet to the same destination node (0 node). Due to CAMA/CA mechanism in MAC layer, such a condition may readily causes lost of source node data packet.

Figure 9:
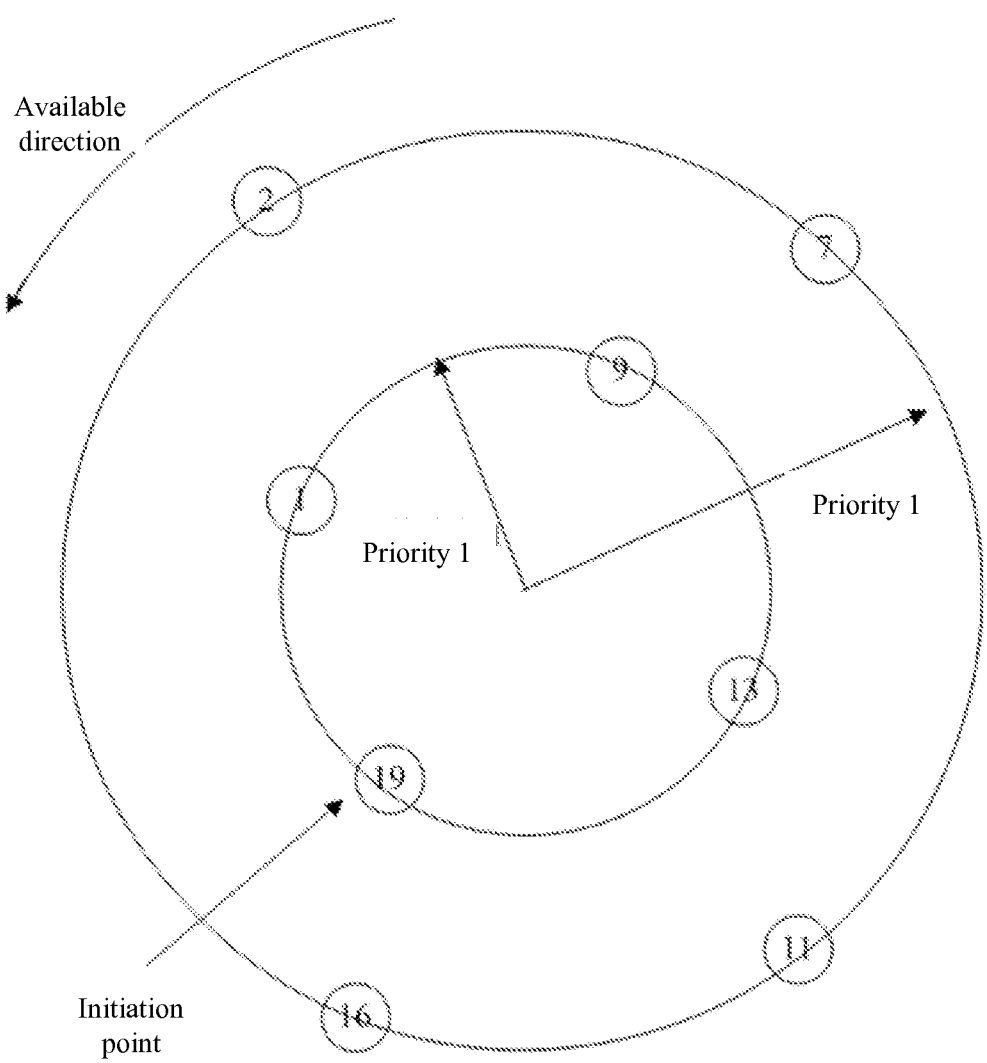
FIG. 9 is a schematic view illustrating polar coordinate structure of middle nodes according to an embodiment of the present invention.

FIG. 9 is a schematic view illustrating polar coordinate structure of the relay node according to an embodiment of the present invention.

According to the method provided in the present invention, during communication, the convergent node (node 0) dispatches the relay node according to RREQ signal.

In the embodiment, the priority of the relay node is determined based on the distance between the relay node and the convergent node. It can be seen from Table 1 and FIG. 9, the priority of nodes 19, 13, 9 and 1 is 1, and the priority of the nodes 2, 16, 11 and 7 is 2. Of course, the priority of selecting the relay node may be determined according to other factors based on application requirements.

In the embodiment, the relay node can be firstly selected from the nodes whose priority is 1. In other embodiments, the relay node can be firstly selected from the nodes whose priority is 2 (or 3, or 4). In nodes whose priority is 1, it is judged that the node 19 is nearest to the collision area, so the node 19 is selected as an initiation point, and the node is selected to be turned off in an available direction in the following order: 19→13→9→1→2→16→11→7.

In the embodiment, the relay node is selected by taking a counter clockwise direction as the available direction. As another selection, the relay node may be selected by taking a clockwise direction as the available direction.

Returning FIG. 6C, when the configuring unit 605 configures to turn on the collision locating section 401, the relay node selecting section 402 and the relay node controlling section 403, the wireless communication apparatus 603 according to the present invention may be used as node 0 in the above embodiment.

In a further embodiment of the above wireless communication apparatus, the relay node controlling section is configured to control the selected relay node to turn on in the event that the collision in the collision area is not alleviated nor eliminated after the selected relay node is turned off, and, the relay node selecting section is configured to select another relay node which is located outside the collision area and turn-off of which will not influence the connectivity in the ad-hoc network in response to controlling the selected relay node to turn on.

In a further embodiment of the above wireless communication apparatus, the another selected relay node spaces a specific number of hops from the selected relay node.

In a further embodiment of the above wireless communication apparatus, the relay node selecting section is further configured to select in preference the relay node having a smaller distance from a boundary of the collision area.

In a further embodiment of the above wireless communication apparatus, the relay node selecting section is further configured to select the relay node whose turn-on and turn-off have an influence on the network topology satisfying a predetermined requirement.

In a further embodiment of the above wireless communication apparatus, the predetermined requirement comprises turn-on and turn-off of the relay node influence only communication of its adjacent nodes, or turn-on and turn-off of the relay node influence communications of its abutting areas.

In a further embodiment of the above wireless communication apparatus, it is determined that the collision in the collision area is alleviated or eliminated, if the number of the nodes in the collision area, each of which repeatedly transmits a route request for a number of times larger than a threshold value within a specific time period after the selected relay node is turned off, decreases.

In a further embodiment of the above wireless communication apparatus, the influence due to turn-on and turn-off of the relay node on the network topology is predetermined.

In a further embodiment of the above wireless communication apparatus, the on-demand driving routing protocol is Ad-hoc On-demand Distance Vector Routing.

Another embodiment of the present invention is a wireless communication network comprising the wireless communication apparatus of any of the above embodiments.

Another embodiment of the present invention is a method of controlling routing selection in wireless communication network, comprising a collision locating step of detecting a collision and determining a collision area in which the collision occurs, according to route requests received through an ad-hoc network based on an on-demand driving routing protocol; a relay node selecting step of selecting a relay node which is located outside the collision area and turn-off of which will not influence connectivity in the ad-hoc network; and a relay node controlling step of controlling the selected relay node to turn off in response to the selection of the relay node and keeping the selected node off if the collision in the collision area is alleviated or eliminated after the selected relay node is turned off.

By applying the present invention, routing can be established more rapidly because a chance of alleviating or eliminating a collision can be obtained through dynamically changing network topology in case of a detection of a collision, thereby improving routing selection efficiency of the ad-hoc network.

By using the wireless communication apparatus, wireless communication network and method of controlling routing selection in wireless communication network of the present invention, the network topology may be regulated dynamically, thereby improving routing selection efficiency to thereby improve network real-time performance and energy efficiency.

The present invention is described above by referring to specific embodiments. However, those skilled in the art would appreciate that various modification and changes may be made without departing from the range of the invention as defined in the Claims.

What is claimed is:

1. A wireless communication apparatus, comprising:
   a collision locating section configured to detect a collision and determining a collision area in which the collision occurs, according to route requests received through an ad-hoc network based on an on-demand driving routing protocol;
   a relay node selecting section configured to select a first relay node which is located outside the collision area and turn-off of which will not influence connectivity in the ad-hoc network; and
   a relay node controlling section configured to control the first relay node to turn off in response to the selection of the first relay node and keeping the first node off if the collision in the collision area is alleviated or eliminated after the first relay node is turned off.

2. The wireless communication apparatus according to claim 1, wherein, the relay node controlling section is configured to control the first relay node to turn on in the event that the collision in the collision area is not alleviated nor eliminated after the first relay node is turned off, and, the relay node selecting section is configured to select a second relay node which is located outside the collision area and turn-off of which will not influence the connectivity in the ad-hoc network in response to controlling the first relay node to turn on.

3. The wireless communication apparatus according to claim 2, wherein, the second relay node spaces a specific number of hops from the first relay node.

4. The wireless communication apparatus according to claim 1, wherein, the relay node selecting section is further configured to select in preference the first relay node having a smaller distance from a boundary of the collision area.

5. The wireless communication apparatus according to claim 1, wherein, the relay node selecting section is further configured to select the first relay node whose turn-on and turn-off have an influence on the network topology satisfying a predetermined requirement.

6. The wireless communication apparatus according to claim 5, wherein, the predetermined requirement comprising:
   the turn-on and turn-off of the first relay node only influence the communication between the first relay node and nodes adjacent thereto, or the turn-on and turn-off of the first relay node influence the communication of an area adjacent to the first relay node.

7. The wireless communication apparatus according to claim 1, wherein, it is determined that the collision in the collision area is alleviated or eliminated, if the number of the nodes in the collision area, each of which repeatedly transmits a route request for a number of times larger than a threshold value within a specific time period after the first relay node is turned off, decreases.

8. The wireless communication apparatus according to claim 1, wherein, the influence due to turn-on and turn-off of the first relay node on the network topology is predetermined.

9. The wireless communication apparatus according to claim 1, wherein, the on-demand driving routing protocol is Ad-hoc On-demand Distance Vector Routing.

10. A method of controlling routing selection in a wireless communication network, comprising:
    detecting a collision and determining a collision area in which the collision occurs, according to route requests received through an ad-hoc network based on an on demand driving routing protocol;
    selecting a first relay node which is located outside the collision area and turn-off of which will not influence connectivity in the ad-hoc network; and
    controlling the first relay node to turn off in response to the selection of the first relay node and keeping the first relay node off if the collision in the collision area is alleviated or eliminated after the first relay node is turned off.

11. The method of controlling routing selection according to claim 10, wherein, further comprises controlling the first relay node to turn on in the event that the collision in the collision area is not alleviated nor eliminated after the first relay node is turned off, and, the relay node selecting step further comprises selecting a second relay node which is located outside the collision area and turn-off of which will not influence the connectivity in the ad-hoc network in response to controlling the first relay node to turn on.

12. The method of controlling routing selection according to claim 11, wherein, the second relay node spaces a specific number of hops from the first relay node.

13. The method of controlling routing selection according to claim 10, wherein, in the selecting of the first relay node, the first relay node having a smaller distance from a boundary of the collision area is selected in preference.

14. The method of controlling routing selection according to claim 10, wherein, in the selecting of the first relay node, the first relay node whose turn-on and turn-off have an influence on the network topology satisfying a predetermined requirement is select.

15. The method of controlling routing selection according to claim 14, wherein, the predetermined requirement comprises:

the turn-on and turn-off of the first relay node only influence the communication between the first relay node and nodes adjacent thereto, or the turn-on and turn-off of the first relay node influence the communication of an area adjacent to the first relay node.

16. The method of controlling routing selection according to claim 10, wherein, it is determined that the collision in the collision area is alleviated or eliminated, if the number of the nodes in the collision area, each of which repeatedly transmits a route request for a number of times larger than a threshold value within a specific time period after the first relay node is turned off, decreases.

17. The method of controlling routing selection according to claim 10, wherein, the influence due to turn-on and turn-off of the first relay node on the network topology is predetermined.

18. The method of controlling routing selection according to claim 10, wherein, the on-demand driving routing protocol is Ad-hoc On-demand Distance Vector Routing.

19. A wireless communication network comprising the wireless communication apparatus according to claim 1.

* * * * *